United States Patent
Robinette

(10) Patent No.: US 8,668,616 B2
(45) Date of Patent: Mar. 11, 2014

(54) NINE SPEED DUAL CLUTCH TRANSMISSION

(75) Inventor: Darrell Lee Robinette, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 388 days.

(21) Appl. No.: 13/078,082

(22) Filed: Apr. 1, 2011

(65) Prior Publication Data
US 2012/0252626 A1  Oct. 4, 2012

(51) Int. Cl.
*F16H 37/02* (2006.01)
(52) U.S. Cl.
USPC .......................................... 475/284; 475/207
(58) Field of Classification Search
None
See application file for complete search history.

(56) References Cited

U.S. PATENT DOCUMENTS

| | | | |
|---|---|---|---|
| 3,589,483 A * | 6/1971 | Smith | 192/3.52 |
| 5,823,051 A * | 10/1998 | Hall, III | 74/325 |
| 7,470,206 B2 | 12/2008 | Rodgers, II | |
| 8,323,142 B2 * | 12/2012 | Masumoto | 475/218 |
| 2005/0255958 A1 * | 11/2005 | Tiesler et al. | 475/275 |
| 2007/0131046 A1 | 6/2007 | Borgerson | |
| 2008/0245168 A1 * | 10/2008 | Heinzelmann | 74/335 |
| 2013/0053204 A1 * | 2/2013 | Slapak | 475/209 |

FOREIGN PATENT DOCUMENTS

| | | |
|---|---|---|
| DE | 102006039687 | 3/2008 |
| WO | WO2006084555 | 8/2006 |

* cited by examiner

*Primary Examiner* — David D Le
*Assistant Examiner* — Steven B Christ

(57) ABSTRACT

A transmission is connectable to an input member and includes first and second shaft members, first and second countershaft members, a plurality of co-planar gear sets, a compound planetary gear set, a plurality of torque transmitting elements, and an output member. The torque transmitting devices include a plurality of brakes, synchronizer assemblies, and clutches including a dual clutch assembly. The transmission is operable to provide at least three reverse speed ratios and at least nine forward speed ratios between the input member and the output member.

17 Claims, 1 Drawing Sheet

| Gear State | 36 | 38 | 90b | 90a | 92 | 94 | 96 | 98 | Ratio | Ratio Step | OAR |
|---|---|---|---|---|---|---|---|---|---|---|---|
| 1 | X | | X | | | | | X | 4.344 | | 6.517 |
| 2 | X | | X | | | X | | | 2.797 | 1.55 | |
| 3 | X | | X | | | | X | | 2.106 | 1.33 | |
| 4 | | X | | | | | | X | 1.621 | 1.30 | |
| 5 | X | | | X | | | | X | 1.375 | 1.18 | |
| 6 | | X | | | | | X | | 1.043 | 1.32 | |
| 7 | X | | | X | | | X | | 0.885 | 1.18 | |
| 8 | | X | | | | X | | | 0.786 | 1.13 | |
| 9 | X | | | X | X | | | | 0.667 | 1.18 | |
| R1 | X | | | | X | | | X | -3.466 | | |
| R2 | X | | | | X | | X | | -2.231 | | |
| R3 | X | | | | X | X | | | -1.680 | | |

NINE SPEED DUAL CLUTCH TRANSMISSION

TECHNICAL FIELD

The present disclosure relates to transmissions and more particularly to a compact, dual clutch multiple speed transmission having at least two countershafts and a planetary gear set to establish nine or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission that includes a plurality of co-planar gear sets and a compound planetary gear set. The transmission is operable to provide at least three reverse speed ratios and at least nine forward speed ratios.

In another aspect of the present invention, the transmission includes a dual clutch assembly having a first clutch, second clutch, and a clutch housing connectable to an engine output member.

In another aspect of the present invention, the transmission includes a first, second, third, and fourth gear set each including a first gear in mesh with a second gear. The fourth gear set includes a third gear in mesh with the first gear of the fourth gear set.

In another aspect of the present invention, the transmission includes a first transmission input member rotatably supported in the transmission housing. The first gears of the second and third gear sets are disposed on the first transmission input member and the selective engagement of the first clutch of the dual clutch assembly transfers torque from the clutch housing to the first transmission input member.

In another aspect of the present invention, the transmission includes a second transmission input member rotatably supported in the transmission housing. The first gear of the first gear set is disposed on the second transmission input member and the second transmission input member is concentric with the first transmission input member and at least partially surrounds the first transmission input member. The selective engagement of the second clutch of the dual clutch assembly transfers torque from the clutch housing to the second transmission input member.

In another aspect of the present invention, the transmission includes a first countershaft rotatably supported within the transmission housing and spaced apart from and parallel with the first and second transmission input members. The second gear of the first gear set and the third gear of the fourth gear set are disposed on the first countershaft.

In another aspect of the present invention, the transmission includes a second countershaft rotatably supported within the transmission housing and spaced apart from and parallel with the first and second transmission input members. Wherein the second gears of the second, third, and fourth gear sets are disposed on the second countershaft.

In another aspect of the present invention, the transmission includes an interconnecting member fixed for common rotation with the first gear of the fourth gear set.

In another aspect of the present invention, the transmission includes a first synchronizer assembly for selectively coupling at least one of the second gears with one of the first countershaft and the second countershaft.

In another aspect of the present invention, the transmission includes a compound planetary gear set including a first, second, third, fourth, fifth, and sixth member. The first member is fixed for common rotation with the interconnecting member and the sixth member is fixed for common rotation with a transmission output member.

In another aspect of the present invention, the transmission includes at least three torque transmitting devices each selectively connecting at least one of the first, second, third, fourth, fifth, and sixth members with at least one of a stationary member and the interconnecting member.

In another aspect of the present invention, selective engagement of the first and second clutches of the dual clutch assembly interconnects the dual clutch housing with at least one of the first and the second transmission input members and the selective engagement of at least one of the first synchronizer assembly and the torque transmitting devices establishes at least one of nine forward speed ratios.

The above features and advantages and other features and advantages of the present invention are readily apparent from the following detailed description of the best modes for carrying out the invention when taken in connection with the accompanying drawings wherein like reference numbers refer to the same component, element or feature.

DESCRIPTION

Figures 1, 2:
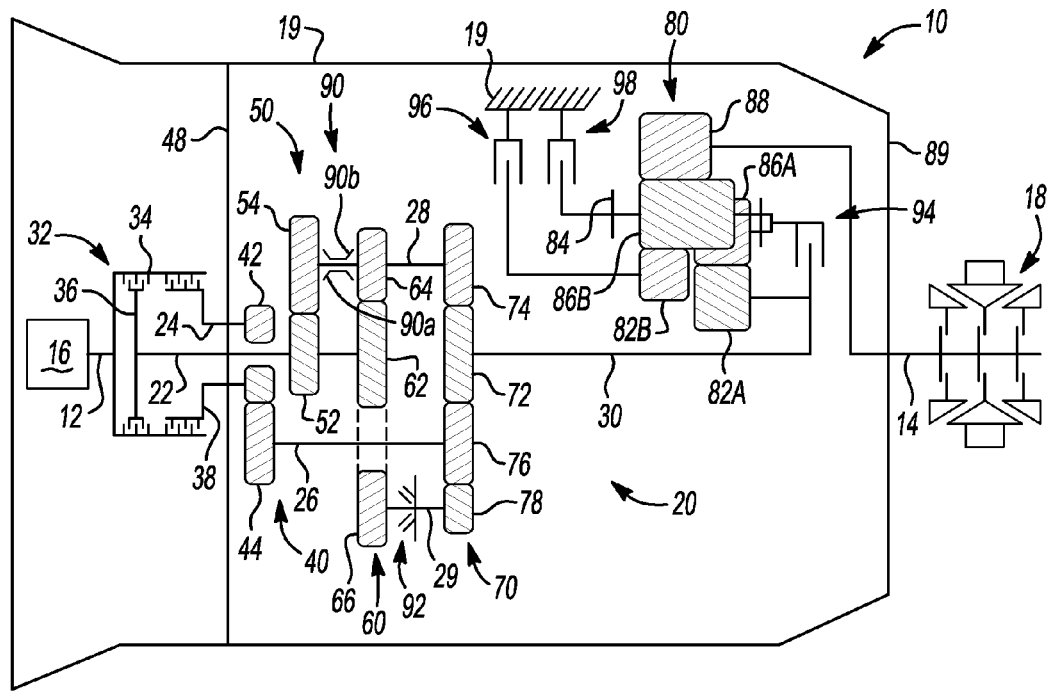
FIG. 1 is a schematic view of an embodiment of a nine speed transmission having a dual clutch, two input shafts, a plurality of gear sets, and a plurality of torque transmitting elements, in accordance with the present invention.
FIG. 2 is a truth table presenting the state of engagement of the various torque transmitting elements in each of the available forward and reverse speeds or gear ratios of the transmission illustrated in FIG. 1.

Referring to FIG. 1, a multiple speed transmission is generally indicated by reference number 10. The transmission 10 is connectable to an input member 12 and has an output member or gear 14. In the present embodiment, the input member 12 is a shaft and the output member 14 is a shaft, however those skilled in the art will appreciate that the input member 12 and the output member 14 may be components other than shafts, such as gears.

The input member 12 is continuously connected with an engine 16 or other torque producing machine to provide a driving torque to input member 12. The output member or gear 14 rotatably drives a differential assembly 18. The differential assembly 18 transfers torque delivered by output member 14, ultimately, to a pair road wheels (not shown).

The transmission 10 includes a housing 19 that at least partially encloses a gearing arrangement 20. The gearing arrangement 20 includes various shafts or members, co-planar intermeshing gear sets, a dual clutch assembly, selectively engageable synchronizers, clutches, and brakes, and a planetary gear set, as will be described herein. For example, the gearing arrangement 20 includes a first transmission input shaft or member 22, a second transmission input shaft or member 24, a first countershaft 26, a second countershaft 28, a third countershaft 29, and an interconnecting shaft or member 30. The second transmission input shaft or member 24 is a hollow shaft that is concentric with and overlies the first transmission input shaft or member 22. The first countershaft 26, the second countershaft 28, and the third countershaft 29 are each spaced apart from and parallel with the first and second transmission input shaft members 22, 24. The first and second transmission input shafts 22, 24 define a first axis of rotation, the first countershaft 26 defines a second axis of rotation, the second countershaft 28 defines a third axis of rotation, and the third countershaft 29 defines a fourth axis of rotation. The position and location of countershafts 26, 28, 29 relative to first and second transmission input shafts 22, 24 are interchangeable. The interconnecting shaft or member 30 is generally coaxial with the input shafts 22, 24 and axially separated towards the output member 14.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24. It should be appreciated that while the dual clutch assembly 32 is shown throughout the Figures as a wet clutch assembly, the dual clutch assembly 32 may be other types and may be disposed in other locations. For example, in alternative embodiments the dual clutch assembly may be a dry clutch assembly, part of a torque converter assembly, may include an electric motor assembly, or any combination or variation thereof containing two clutching mechanisms. Similarly, the dual clutch assembly may be located either inside or outside of the transmission housing at the input of the transmission without departing from the scope of the present invention.

The gearing arrangement 20 also includes a plurality of co-planar, meshing gear sets 40, 50, 60, 70, and a planetary gear set 80. The present invention contemplates that the plurality of co-planar, meshing gear sets 40, 50, 60 may be arranged axially along transmission input shafts 22, 24 in an order other than that which is shown in FIG. 1 and still be within the scope of the invention. Co-planar gear set 40 includes first pinion gear 42 and second pinion gear 44. First pinion gear 42 is rotatably fixed and connected for common rotation with the second transmission input shaft member 24. Second pinion gear 44 is fixed and connected for common rotation with the first countershaft member 26 and meshes with first pinion gear 42. It should be appreciated that first pinion gear 42 may be a separate gear structure fixed to the second transmission input shaft member 24 or gear teeth/splines formed on an outer surface of the second transmission input shaft member 24 without departing from the scope of the present invention. Gear set 40 is disposed proximate a wall 48 of the transmission housing 19 that is on a front or side of the transmission 10 proximate the dual clutch assembly 32.

Co-planar gear set 50 includes first pinion gear 52 and second pinion gear 54. First pinion gear 52 is rotatably fixed and connected for common rotation with the first transmission input shaft member 22 and meshes with second pinion gear 54. Second pinion gear 54 is selectively connectable for common rotation with the second countershaft member 28. Gear set 50 is positioned adjacent gear set 40.

Co-planar gear set 60 includes first pinion gear 62, second pinion gear 64, and third pinion gear 66. First pinion gear 62 is rotatably fixed and connected for common rotation with the first transmission input shaft member 22 and meshes with second pinion gear 64 and third pinion gear 66. Second pinion gear 64 is selectively connectable for common rotation with the second countershaft member 28. Third pinion gear 66 is selectively connectable for common rotation with the third countershaft member 29. Gear set 60 is disposed adjacent gear set 50.

Co-planar gear set 70 includes first pinion gear 72, second pinion gear 74, third pinion gear 76, and fourth pinion gear 78. First pinion gear 72 is rotatably fixed and connected for common rotation with the interconnecting member 30 and meshes with second pinion gear 74 and third pinion gear 76. Second pinion gear 74 is fixed and connected for common rotation with the second countershaft member 28. Third pinion gear 76 is fixed and connected for common rotation with the first countershaft member 26. Fourth pinion gear 78 is fixed and connected for common rotation with the third countershaft member 29 and is meshed with the third pinion gear 76. Gear set 70 is positioned adjacent gear set 60.

In the example provided, planetary gear set 80 is a compound or Ravigneaux planetary gear set. Planetary gear set 80 includes first sun gear 82A, second sun gear 82B, carrier member 84, first planet gear 86A, second planet gear 86B, and ring gear 88. First sun gear 82A is fixed for common rotation with the interconnecting member 30 and meshed with the first planet gear 86A. Second sun gear 82B is meshed with second planet gear 86B. Carrier member 84 rotatably supports planet gears 86A, 86B. Second planet gear 86B is meshed with first planet gear 86A, second sun gear 82B, and ring gear 88. Ring gear 88 is connected for common rotation with the output member 14. Gear set 80 is positioned between gear set 70 and an end wall 89 of the transmission housing 19.

With continued reference to FIG. 1, the transmission 10 further includes a plurality of torque transmitting elements, including selectively engageable synchronizer assemblies 90, 92, clutch 94, and brakes 96, 98. Synchronizer 90 is a double sided synchronizer and generally includes a shift fork (not shown) that is bi-directionally translated by an actuator (not shown) into at least two engaged positions and a neutral or disengaged position. Synchronizer 90 has a first side 90A that is selectively actuatable to connect gear 54 for common rotation with the second countershaft member 28 and has a second side 90B that is selectively actuatable to connect gear 64 for common rotation with the second countershaft member 28. Synchronizer 92 is a single sided synchronizer and generally includes a shift fork (not shown) that is bi-directionally translated by an actuator (not shown) into at least one engaged position and a neutral or disengaged position. Synchronizer 92 is selectively actuatable to connect for common rotation gear 66 with the third countershaft member 29. In an alternative embodiment, the second synchronizer selectively connects the fourth gear of the fourth gear set with the third countershaft and the third gear of the third countershaft is fixed for rotation with the third countershaft.

The clutch 94 and the brakes 96, 98 allow for selective interconnection of the shafts or interconnecting members, the members of the planetary gear set, and the housing. For example, the clutch 94 is selectively engageable to connect the interconnecting member 30 with the carrier member 84 of the planetary gear set 80. The brake 96 is selectively engageable to connect the second sun gear 82B with a stationary element or the housing 19 in order to prevent the second sun gear 82B from rotating relative to the transmission housing 19. Second brake 98 is selectively engageable to connect the carrier 84 with a stationary element or the transmission housing 19 in order to prevent the carrier 84 from rotating relative to the transmission housing 19.

Referring now to FIG. 2, and with continued reference to FIG. 1, the operation of the embodiment of the nine speed transmission 10 will be described. It will be appreciated that the transmission 10 is capable of transmitting torque from the input shaft or member 12 to the output shaft or member 14 in at least nine forward speed or torque ratios and at least three reverse speed or torque ratios. Each forward and reverse speed or torque ratio is attained by engagement of one or more of the torque-transmitting mechanisms and synchronizers (i.e. clutch element 36, clutch element 38, synchronizer 90, synchronizer 92, clutch 94, first brake 96, and second brake 98), as will be explained below. FIG. 2 is a truth table presenting the various combinations of torque-transmitting elements and synchronizers that are activated or engaged to achieve the various gear states. Actual numerical gear ratios of the various gear states are also presented, although it should be appreciated that these numerical values are exemplary only and that they may be adjusted over significant ranges to accommodate various applications and operational criteria of the transmission 10. Examples of the gear ratios that may be obtained using the embodiments of the present invention are also shown in FIG. 2. Of course, other gear ratios are achievable depending on the gear diameter, gear teeth count and gear configuration selected.

To establish first gear, the clutch element 36, the second side 90B of the synchronizer 90, and the brake 98 are engaged or activated. Input torque from the input shaft 12 is transferred through the dual clutch assembly 32 to the first transmission input shaft member 22, through pinion gear 62 to gear 64, from gear 64 to the second countershaft member 28 through the second side 90B of synchronizer 90, then to second pinion gear 74 and from second pinion gear 74 to the first pinion gear 72 and the interconnecting member 30. The brake 98 connects the carrier member 84 with a stationary element or the transmission housing 19 in order to prevent the carrier member 84 from rotating relative to the transmission housing 19 to achieve the first gear ratio. Likewise, the remaining nine forward ratios and reverse speed ratios are achieved through different combinations of clutch, synchronizer, and brake engagement, as shown in FIG. 2.

It will be appreciated that the foregoing explanation of operation and gear states of the nine speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Again, it should be appreciated that any one of gear sets 40, 50, 60, 70, and 80 may be changed in size and number gear teeth or gear pitch to produce a certain forward and reverse torque ratio without departing from the scope of the present invention.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example, the present configuration allows for favorable internal hardware content, spin loss characteristics, and launch strategy flexibility. Thus, a transmission having a more simplified actuation and control system, reduced mass and cost, and improved packaging is achieved.

While the best modes for carrying out the invention have been described in detail, those familiar with the art to which this invention relates will recognize various alternative designs and embodiments for practicing the invention within the scope of the appended claims.

The invention claimed is:
1. A transmission comprising:
a dual clutch assembly having a first clutch, second clutch and a clutch housing connectable to an engine output member;
a first, second, third, and fourth gear set each including a first gear in mesh with a second gear, wherein the fourth gear set includes a third gear in mesh with the first gear of the fourth gear set;
a first transmission input member rotatably supported in the transmission housing wherein the first gears of the second and third gear sets are disposed on the first transmission input member and wherein the selective engagement of the first clutch of the dual clutch assembly transfers torque from the clutch housing to the first transmission input member;
a second transmission input member rotatably supported in the transmission housing wherein the first gear of the first gear set is disposed on the second transmission input member and wherein the second transmission input member is concentric with the first transmission input member and at least partially surrounds the first transmission input member and wherein the selective engagement of the second clutch of the dual clutch assembly transfers torque from the clutch housing to the second transmission input member;
a first countershaft rotatably supported within the transmission housing and spaced apart from and parallel with the first and second transmission input members, wherein the second gear of the first gear set and the third gear of the fourth gear set are disposed on the first countershaft;
a second countershaft rotatably supported within the transmission housing and spaced apart from and parallel with the first and second transmission input members, wherein the second gears of the second, third, and fourth gear sets are disposed on the second countershaft;
an interconnecting member fixed for common rotation with the first gear of the fourth gear set;
a first synchronizer assembly for selectively coupling at least one of the second gears with one of the first countershaft and the second countershaft;
a compound planetary gear set including a first, second, third, fourth, fifth, and sixth member, wherein the first member is fixed for common rotation with the interconnecting member and the sixth member is fixed for common rotation with a transmission output member; and
at least three torque transmitting devices each selectively connecting at least one of the first, second, third, fourth, fifth, and sixth members with at least one of a stationary member and the interconnecting member, wherein the selective engagement of the first and second clutches of the dual clutch assembly interconnects the dual clutch housing with at least one of the first and the second transmission input members and the selective engagement of at least one of the first synchronizer assembly and the torque transmitting devices establishes at least one of nine forward speed ratios and wherein the first member of the compound planetary gear set is a first sun gear, the second member is a second sun gear, the third member is a first planet gear meshed with the first sun gear, the fourth member is a second planet gear in mesh with the second sun gear and the first planet gear, the fifth member is a carrier member that supports the first and second planet gears, and the sixth member is a ring gear meshed with the second planet gear.

2. The transmission of claim 1 wherein a first of the at least three torque transmitting devices is a clutch for selectively connecting the interconnecting member with the fifth member of the compound planetary gear set.

3. The transmission of claim 2 wherein a second of the at least three torque transmitting devices is a first brake for selectively connecting the second member of the compound planetary gear set with the stationary member.

4. The transmission of claim 3 wherein a third of the at least three torque transmitting devices is a second brake for selectively connecting the fifth member of the compound planetary gear set with the stationary member.

5. The transmission of claim 4 wherein the compound planetary gear set is a Ravigneaux type planetary gear set.

6. The transmission of claim 1 wherein the first gears of the second and third gear sets are rotatably fixed for common rotation with the first transmission input member.

7. The transmission of claim 6 wherein the first gear of the first gear set is rotatably fixed for common rotation with the second transmission input member.

8. The transmission of claim 7 wherein the second gear of the first gear set and the third gear of the fourth gear set are fixed for common rotation with the first countershaft.

9. The transmission of claim 8 wherein the second gears of the second and third gear sets are selectably connectable to the second countershaft and the second gear of the fourth gear set is fixed for common rotation with the second countershaft.

10. The transmission of claim 1 wherein the first synchronizer assembly selectively couples the second gear of the second gear set with the second countershaft and selectively couples the second gear of the third gear set with the second countershaft.

11. The transmission of claim 1 further including a third countershaft rotatably supported within the transmission housing and spaced apart from and parallel with the first and second transmission input members, wherein a third gear of the third gear set is meshed with the first gear of the third gear set and disposed on the third countershaft, and wherein a fourth gear of the fourth gear set is meshed with the third gear of the fourth gear set and disposed on the third countershaft.

12. The transmission of claim 11 further including a second synchronizer assembly for selectively connecting one of the third gear of the third gear set and the fourth gear of the fourth gear set with the third countershaft, wherein selective engagement of the second synchronizer assembly and at least one of the first clutch, second clutch, and the at least three torque transmitting devices establishes one of at least three reverse speed ratios.

13. The transmission of claim 11 wherein the third gear of the third gear set is selectively connectable with the third countershaft and the fourth gear of the third gear set is fixed for common rotation with the third countershaft.

14. The transmission of claim 1 wherein the first gear set is adjacent the dual clutch assembly, the second gear set is adjacent the first gear set, the third gear set is adjacent the second gear set, the fourth gear set is adjacent the third gear set, and the compound planetary gear set is disposed between the fourth gear set and an end wall of the transmission housing.

15. The transmission of claim 1 wherein the gears of the first, second, third, and fourth gear sets are co-planar with gears in the same gear set.

16. A transmission comprising:
a transmission housing;
a dual clutch assembly having a first clutch, second clutch, and a clutch housing connectable to an engine output member;
a first, second, third, and fourth gear set, wherein the first gear set includes a first gear in mesh with a second gear, the second gear set includes a first gear in mesh with a second gear, the third gear set includes a first gear in mesh with a second gear and a third gear, and the fourth gear set includes a first gear in mesh with a second gear and a third gear, wherein a fourth gear of the fourth gear set is meshed with the third gear of the fourth gear set;
a first transmission input member rotatably supported in the transmission housing, wherein the first gears of the second and third gear sets are fixed for common rotation with the first transmission input member, and wherein the selective engagement of the first clutch of the dual clutch assembly transfers torque from the clutch housing to the first transmission input member;
a second transmission input member rotatably supported in the transmission housing, wherein the first gear of the first gear set is rotatably fixed for common rotation with the second transmission input member, and wherein the second transmission input member is concentric with the first transmission input member and at least partially surrounds the first transmission input member, and wherein the selective engagement of the second clutch of the dual clutch assembly transfers torque from the clutch housing to the second transmission input member;
a first countershaft rotatably supported within the transmission housing and spaced apart from and parallel with the first and second transmission input members, wherein the second gear of the first gear set and the third gear of the fourth gear set are fixed for common rotation with the first countershaft;
a second countershaft rotatably supported within the transmission housing and spaced apart from and parallel with the first and second transmission input members, wherein the second gears of the second and third gear sets are selectably connectable to the second countershaft and the second gear of the fourth gear set is fixed for common rotation with the second countershaft;
a third countershaft rotatably supported within the transmission housing and spaced apart from and parallel with the first and second transmission input members, wherein the third gear of the third gear set is selectably connectable to the third countershaft and the fourth gear of the fourth gear set is fixed for common rotation with the third countershaft;
an interconnecting member, wherein the first gear of the fourth gear set is fixed for common rotation with the interconnecting member; and a first synchronizer assembly for selectively coupling the second gear of the second gear set with the second countershaft and for selectively coupling the second gear of the third gear set with the second countershaft;

a second synchronizer assembly for selectively coupling the third gear of the third gear set with the third countershaft;

a compound planetary gear set including a first sun gear fixed for common rotation with the interconnecting member, a second sun gear, a first planet gear meshed with the first sun gear, a second planet gear meshed with the second sun gear and the first planet gear, a carrier member that supports the first and second planet gears, and a ring gear meshed with the second planet gear and fixed for common rotation with a transmission output member; and a planetary clutch for selectively connecting the interconnecting member with the carrier member of the planetary gear set;

a first brake for selectively connecting the second sun gear with a stationary member; and a second brake for selectively connecting the carrier member of the planetary gear set with the stationary member, and wherein the selective engagement of the first and second clutches of the dual clutch assembly interconnects the dual clutch housing with at least one of the first and the second transmission input members and the selective engagement of at least one of the first synchronizer assembly, the second synchronizer assembly, the planetary clutch, the first brake, and the second brake establishes one of at least nine forward speed ratios and three reverse speed ratios.

17. The transmission of claim 16 wherein the gears of the first, second, third, and fourth gear sets are co-planar with gears in the same gear set.

* * * * *